(12) United States Patent
Pate et al.

(10) Patent No.: US 7,181,353 B2
(45) Date of Patent: Feb. 20, 2007

(54) METHOD AND APPARATUS FOR INTEGRATING SIX SIGMA METHODOLOGY INTO INSPECTION RECEIVING PROCESS OF OUTSOURCED SUBASSEMBLIES, PARTS, AND MATERIALS: ACCEPTANCE, REJECTION, TRENDING, TRACKING AND CLOSED LOOP CORRECTIVE ACTION

(75) Inventors: James Pate, Derby, KS (US); Justin Mortensen, Wichita, KS (US); Tony Newell, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 683 days.

(21) Appl. No.: 10/634,416

(22) Filed: Aug. 4, 2003

(65) Prior Publication Data

US 2005/0033468 A1 Feb. 10, 2005

(51) Int. Cl.
*G06F 15/00* (2006.01)
*G06F 11/30* (2006.01)
(52) U.S. Cl. .......................... 702/82; 702/81; 702/182; 702/187
(58) Field of Classification Search ................. 702/34, 702/81–82, 84, 180, 181, 182, 185, 187, 702/188; 700/95, 97, 109
See application file for complete search history.

(56) References Cited

U.S. PATENT DOCUMENTS

| 6,473,720 | B1 | 10/2002 | Hampson ..................... 702/182 |
| 6,512,985 | B1* | 1/2003 | Whitefield et al. ........... 702/81 |
| 6,571,202 | B1 | 5/2003 | Loman et al. ................. 703/2 |
| 2003/0014204 | A1* | 1/2003 | Heslop et al. ................ 702/84 |

* cited by examiner

*Primary Examiner*—Bryan Bui
(74) *Attorney, Agent, or Firm*—Suiter Swantz PC LLO

(57) ABSTRACT

A method for integrating Six Sigma into an inspection receiving process of outsourced products may include the following steps: defining specification limits for product acceptance criteria; identifying and reporting a substandard product to authorized personnel for disposition via a MES (manufacturing execution system) and SCADA (supervisory control and data acquisition); preparing a report containing historical data, identifying root cause and assigning a corrective action; segregating the substandard product, and documenting the substandard product in the MES; disposing the substandard product; documenting and recording the corrective action in the MES; and outlining a method of recovery and eliminating a non-conforming incoming product. The present method may provide a device for a Closed Loop Corrective Action (CLCA).

27 Claims, 2 Drawing Sheets

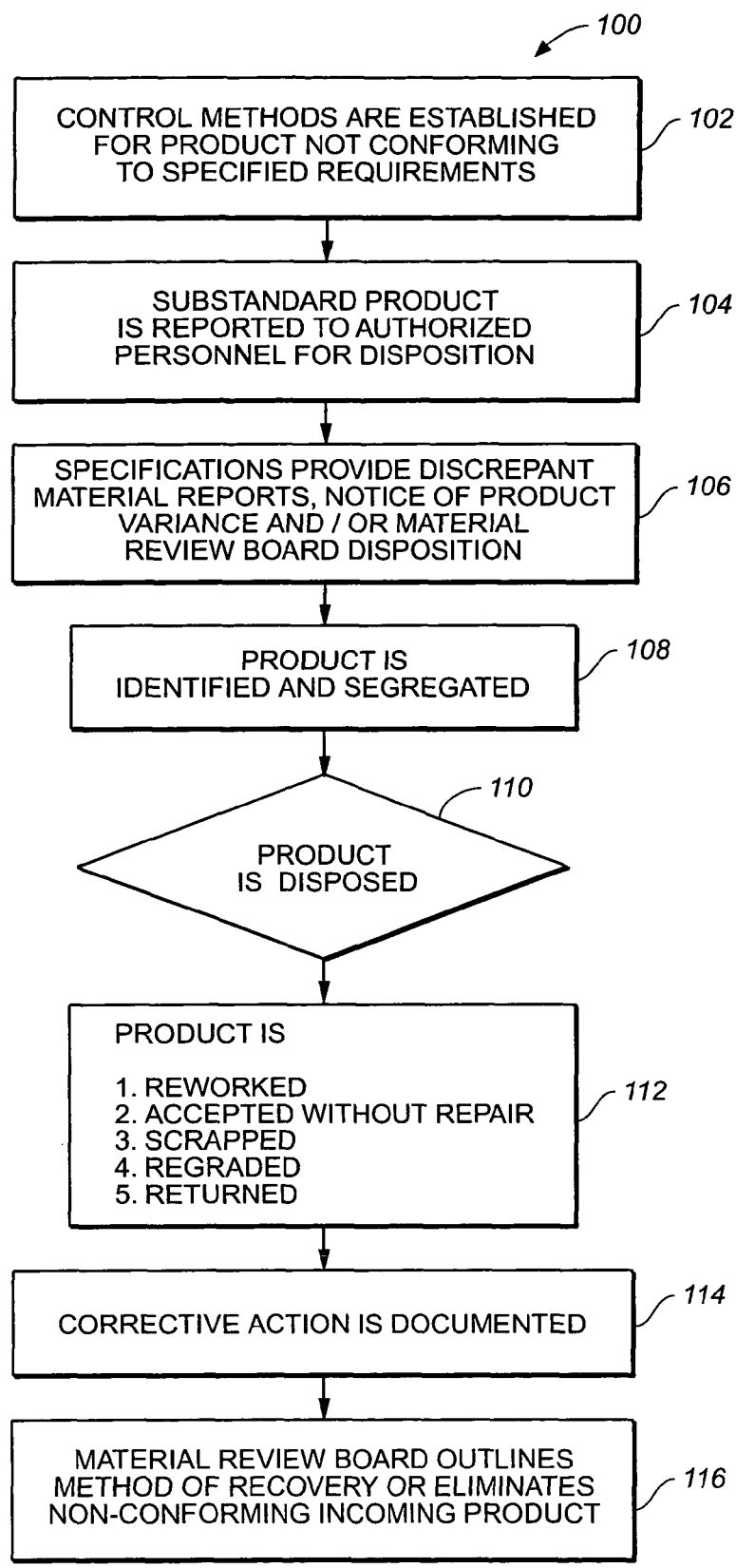
FIG._1 (PRIOR ART)

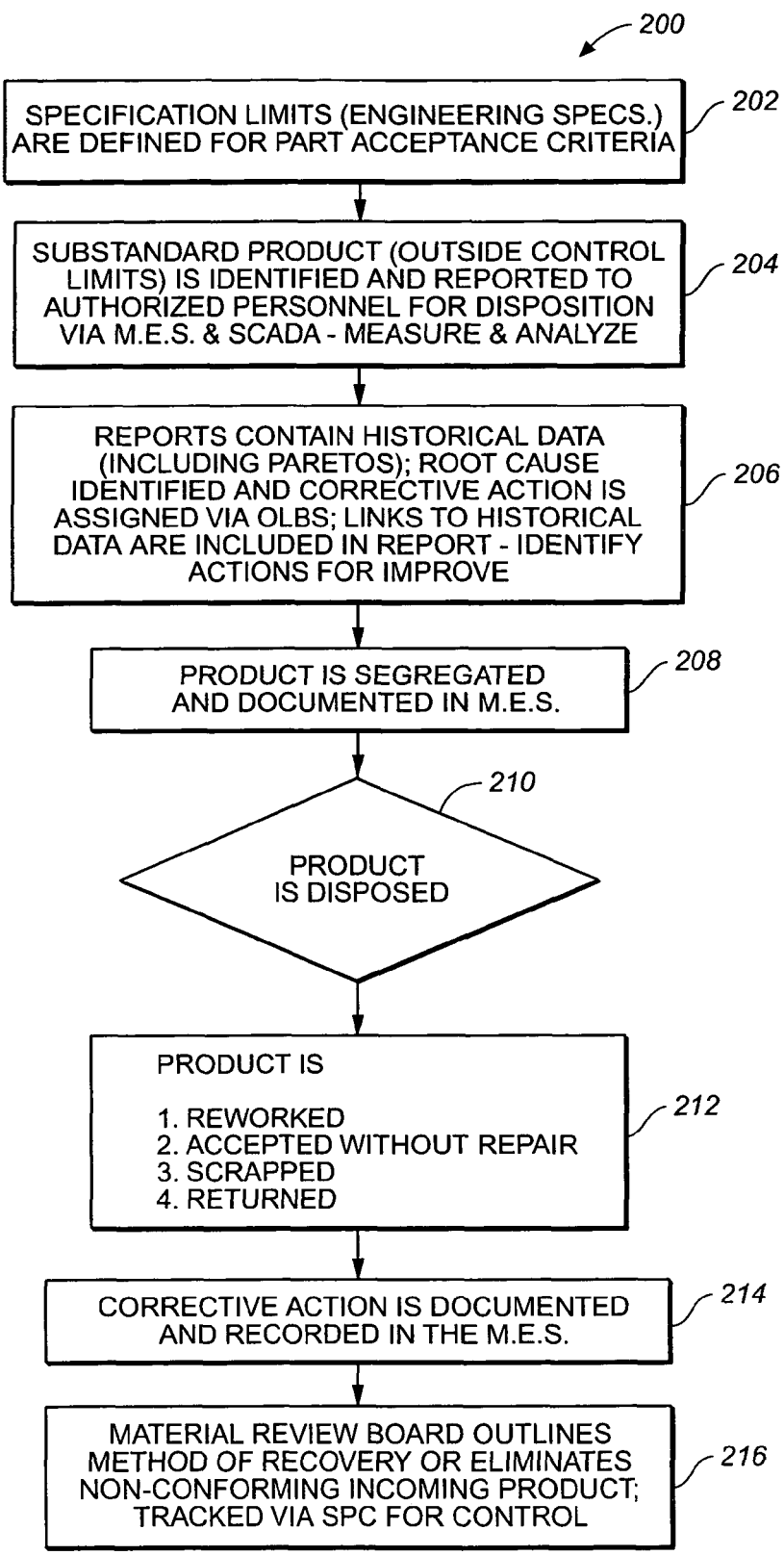
FIG._2

METHOD AND APPARATUS FOR INTEGRATING SIX SIGMA METHODOLOGY INTO INSPECTION RECEIVING PROCESS OF OUTSOURCED SUBASSEMBLIES, PARTS, AND MATERIALS: ACCEPTANCE, REJECTION, TRENDING, TRACKING AND CLOSED LOOP CORRECTIVE ACTION

FIELD OF THE INVENTION

This invention relates generally to an inspection receiving process of outsourced subassemblies, parts, and materials, and particularly to a method and apparatus for integrating the Six Sigma methodology into an inspection receiving process of outsourced subassemblies, parts, and materials: acceptance, rejection, trending, tracking and closed loop corrective action.

BACKGROUND OF THE INVENTION

Six Sigma (or the Six Sigma methodology) is a business problem solving methodology and a measure of quality control that strives for near perfection. Six Sigma is a disciplined, data-driven approach and methodology for eliminating defects (driving towards six standard deviations between the mean and the nearest specification limit) in any process—from manufacturing to transactional and from product to service. The statistical representation of Six Sigma describes quantitatively how a process is performing. To achieve Six Sigma level, a process must not produce more than 3.4 defects per million opportunities, where a Six Sigma defect is defined as anything outside desired specifications, and a Six Sigma opportunity is the total quantity of chances for a defect.

The fundamental objective of the Six Sigma methodology is the implementation of a measurement-based strategy that focuses on process improvement and variation reduction through the application of Six Sigma improvement projects. This is accomplished through the use of two Six Sigma sub-methodologies: DMAIC and DMADV. The Six Sigma DMAIC process (define, measure, analyze, improve, control) is an improvement system for existing processes failing to meet the customer's requirements (internal or external) and looking for incremental improvement. The Six Sigma DMADV process (define, measure, analyze, design, verify) is an improvement system used to develop new processes or products at Six Sigma quality levels and may also be employed if a current process requires more than incremental improvement.

FIG. 1 is a flow chart showing a typical inspection receiving process 100 of outsourced subassemblies, parts, and materials used by a manufacturer (e.g., a data storage device manufacturer, and the like). The process 100 may have many deficiencies. The process 100 may start with step 102, in which control methods are established for an outsourced product (e.g., a subassembly, a part, a material, and the like) not conforming to specified requirements. The deficiency of this step 102 lies in the fact that conventionally there is no online SPC (Statistical Process Control) to detect or monitor the trend of non-conformance. Then, a substandard product is reported to authorized personnel for disposition 104. However, in the step 104, inaccurate disposition by authorized personnel may prevent the true root cause from being identified since the authorized personnel lack SPC information on non-conforming products. Next, a report may be prepared to include specifications that provide discrepant material reports, Notice of product Variance, and/or Material Review Board disposition 106. However, in the step 106, there may be little or no ready access to historical reject trends, root causes, or non-conformance of past products. Then, a substandard product is identified and segregated 108. Next, the substandard product is disposed 110. In the steps 108 and 110, however, there may be potential delay and time lag while awaiting a second disposition, which may lead to breakdown in the continuity of the reject process. Then the substandard product may be reworked, accepted without repair, scrapped, re-graded (re-classified from a high grade to a low grade), or returned 112. Next, the corrective action is determined and documented based on the root cause of the failure(s) 114. However, in the steps 112 and 114, returning or charging non-conforming products may lead to a reactive approach for incoming quality. Both real and opportunity costs may be associated with returns and charge backs. Then, Material Review Board outlines a method of recovery or eliminates a non-conforming incoming product 116. However, in the step 116, the vendor may rework and correct problems, but no tracking of future quality is instigated for initial non-conformance. Thus, there may be a potential for continuing non-conformance of incoming products.

Thus, it would be desirable to provide a method and apparatus for integrating the Six Sigma methodology into an inspection receiving process of outsourced subassemblies, parts, and materials: acceptance, rejection, trending and tracking.

SUMMARY OF THE INVENTION

Accordingly, the present invention is directed to a method and apparatus for integrating the Six Sigma methodology into an inspection receiving process of outsourced subassemblies, parts, and materials. According to an exemplary aspect of the present invention, a method for integrating Six Sigma into an inspection receiving process of outsourced products may include the following steps: defining specification limits for product acceptance criteria; identifying and reporting a substandard product to authorized personnel for disposition via a MES (manufacturing execution system) and SCADA (supervisory control and data acquisition); preparing a report containing historical data, identifying root cause, and assigning a corrective action (i.e., an action planned or taken to stop something from recurring); segregating the substandard product, and documenting the substandard product in the MES; disposing the substandard product; documenting and recording the corrective action in the MES; and outlining a method of recovery and eliminating a non-conforming incoming product. The present method may provide a means for a Closed Loop Corrective Action (CLCA).

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a flow chart showing a typical inspection receiving process of outsourced subassemblies, parts, and materials; and FIG. 2 is a flow chart showing an exemplary method for integrating the Six Sigma methodology into an inspection receiving process of outsourced subassemblies, parts, and materials in accordance with an exemplary aspect of the present invention.

DETAILED DESCRIPTION OF THE INVENTION

Reference will now be made in detail to the presently preferred embodiments of the invention, examples of which are illustrated in the accompanying drawings.

FIG. 2 is a flow chart showing an exemplary method 200 for integrating the Six Sigma methodology into an inspection receiving process of outsourced subassemblies, parts, and materials in accordance with an exemplary aspect of the present invention. Preferably, the Six Sigma methodology used in the method 200 is the DMAIC (define, measure, analyze, improve, control) process.

The method 200 may start with a step 202 in which specification limits (e.g., engineering specifications, and the like) are DEFINED for product acceptance criteria. A product may include a subassembly, a part, a material, and the like. For example, a product may be used by a data storage device manufacturer, and the like. In this step 202, limits (specification and/or calculated control limits) may be defined, recorded and maintained under revision control. Next, a substandard product is identified (preferably based on outside control limits) and reported to authorized personnel for disposition preferably via a MES (manufacturing execution system) and SCADA (supervisory control and data acquisition) 204. This step 204 may be the MEASURE and ANALYZE steps of the DMAIC process. In the step 204, online and real-time SPC may track and monitor product quality, providing a self-alarming function. Then, in step 206, a report may be automatically prepared, which may contain historical data (which may include a Pareto analysis of the historical data, i.e., an analysis based on the Pareto's rule); the root cause may be identified; a corrective action (i.e., an action planned or taken to stop something from recurring) may be assigned preferably via OLBS (On Line Business Systems/Services); and links to historical data may be included in the report. OLBS is a document control system through which users may exchange information and communicate with each other. In the step 206, actions are identified for the IMPROVE step of the DMAIC process. In the step 206, since access to historical reject trends may be readily available, the root cause and nonconformance of past products may be readily determined and/or assigned, which may provide a means for a Closed Loop Corrective Action (CLCA). CLCA is the pattern of activities, which traces the symptoms of a problem to its root cause, produces solutions for preventing the recurrence of the problem, implements the changes, and monitors that the changes have been successful. Then, a substandard product is identified and segregated 208. Next, the substandard product is disposed 210. In the steps 208 and 210, since a report is sent out via real-time SCADA, there may be no delay and time lag while awaiting disposition, and there may be no breakdown in the continuity of the reject (disposition) process (that is, the timeline for events may be monitored via the MES and self-alarming function). The substandard product may be reworked, accepted without repair, scrapped, re-graded (reclassified from a high grade to a low grade), or returned 212. Then, the corrective action is documented and recorded in the MES 214. In the steps 212 and 214, charge backs to the vendor may be automatically recorded and sent to the vendor via SCADA. Next, in step 216, Material Review Board outlines a method of recovery and/or eliminates a non-conforming incoming product (previously rejected substandard products may be tracked via SPC for the CONTROL step of the DMAIC process). The vendor may rework and correct problems, and the root cause may be identified and documented for future reference (if the root cause is eliminated, the problem should not reoccur). Therefore, the potential for continuous shipping of nonconforming product may be greatly diminished.

The present invention may have the following advantages. First, through the application of the Six Sigma methodology, the present invention may eliminate non value-added functions associated with rejecting, accepting, tracking, and trending outsourced parts, subassemblies, and materials. This may minimize the resources and time required to perform these tasks, resulting in lower operating overhead and the associated per unit burden rate. Specifically, the manual tasks and required labor to perform these tasks may be removed. Moreover, a CLCA program may be developed to track substandard parts, subassemblies, and materials.

It is understood that the present invention is not limited to an inspection receiving process of outsourced subassemblies, parts, and materials used for manufacturing a data storage device. Those of ordinary skill in the art will understand that the present invention may be used to an inspection receiving process of any outsourced products without departing from the scope and spirit of the present invention.

It is to be noted that the above described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for integrating Six Sigma into an inspection receiving process of outsourced products, comprising:

defining specification limits for product acceptance criteria;

identifying and reporting a substandard product to authorized personnel for disposition via a MES (manufacturing execution system) and SCADA (supervisory control and data acquisition);

preparing a report containing historical data, identifying root cause and assigning a corrective action;

segregating said substandard product, and documenting said substandard product in said MES;

disposing said substandard product;

documenting and recording said corrective action in said MES;

outlining a method of recovery and eliminating a non-conforming incoming product; and displaying said report containing historical data.

2. The method of claim 1, wherein said specification limits comprise engineering specifications.

3. The method of claim 1, wherein said disposing said substandard product comprises one of reworking said substandard product, accepting said substandard product without repair, scrapping said substandard product, and returning said substandard product.

4. The method of claim 1, wherein said eliminating a non-conforming incoming product is performed based on tracking previously rejected products via SPC (Statistical Process Control).

5. The method of claim 1, wherein said historical data comprises a Pareto analysis.

6. The method of claim 1, wherein said assigning a corrective action is performed via OLBS (On Line Business Systems/Services).

7. The method of claim 1, wherein said substandard product is a substandard subassembly.

8. The method of claim 1, wherein said substandard product is a substandard part.

9. The method of claim 1, wherein said substandard product is a substandard material.

10. The method of claim 1, further comprising sending out said report via real-time SCADA so that there is no delay and time lag while awaiting disposition.

11. The method of claim 1, further comprising monitoring-timeline for events via self-alarming function and said MES so that there is no breakdown in continuity of said disposing process.

12. The method of claim 1, further comprising automatically recording and sending charge backs to a vendor via SCADA.

13. The method of claim 1, wherein said corrective action is CLCA (Closed Loop Corrective Action).

14. A computer-readable medium encoded with computer-executable instructions for performing a method for integrating Six Sigma into an inspection receiving process of outsourced products, said method comprising:

defining specification limits for product acceptance criteria;

identifying and reporting a substandard product to authorized personnel for disposition via a MES (manufacturing execution system) and SCADA (supervisory control and data acquisition);

preparing a report containing historical data, identifying root cause and assigning a corrective action;

segregating said substandard product, and documenting said substandard product in said MES;

disposing said substandard product;

documenting and recording said corrective action in said MES;

outlining a method of recovery and eliminating a non-conforming incoming product; and displaying said report containing historical data.

15. The computer-readable medium of claim 14, wherein said specification limits comprise engineering specifications.

16. The computer-readable medium of claim 14, wherein said disposing said substandard product comprises one of reworking said substandard product, accepting said substandard product without repair, scrapping said substandard product, and returning said substandard product.

17. The computer-readable medium of claim 14, wherein said eliminating a non-conforming incoming product is performed based on tracking previously rejected products via SPC (Statistical Process Control).

18. The computer-readable medium of claim 14, wherein said historical data comprises a Pareto analysis.

19. The computer-readable medium of claim 14, wherein said assigning a corrective action is performed via OLBS (On Line Business Systems/Services).

20. The computer-readable medium of claim 14, wherein said substandard product is a substandard subassembly.

21. The computer-readable medium of claim 14, wherein said substandard product is a substandard part.

22. The computer-readable medium of claim 14, wherein said substandard product is a substandard material.

23. The computer-readable medium of claim 14, wherein said method further comprising sending out said report via real-time SCADA so that there is no delay and time lag while awaiting disposition.

24. The computer-readable medium of claim 14, wherein said method further comprising monitoring timeline for events via self-alarming function and said MES so that there is no breakdown in continuity of said disposing process.

25. The computer-readable medium of claim 14, wherein said method further comprising automatically recording and sending charge backs to a vendor via SCADA.

26. The computer-readable medium of claim 14, wherein said corrective action is CLCA (Closed Loop Corrective Action).

27. An apparatus for integrating Six Sigma into an inspection receiving process of outsourced products, comprising:

means for defining specification limits for product acceptance criteria;

means for identifying and reporting a substandard product to authorized personnel for disposition via a MES (manufacturing execution system) and SCADA (supervisory control and data acquisition);

means for preparing a report containing historical data, identifying root cause and assigning a corrective action;

means for segregating said substandard product and documenting said substandard product in said MES;

means for disposing said substandard product;

means for documenting and recording said corrective action in said MES;

means for outlining a method of recovery and eliminating a non-conforming incoming product; and means for displaying said report containing historical data.

* * * * *